(12) United States Patent
Kerkman et al.

(10) Patent No.: US 6,477,067 B1
(45) Date of Patent: Nov. 5, 2002

(54) METHOD AND APPARATUS FOR COMPENSATING FOR DEVICE DYNAMICS IN INVERTER BASED CONTROL SYSTEMS

(75) Inventors: Russel J. Kerkman, Milwaukee, WI (US); David Leggate, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/969,382

(22) Filed: Oct. 2, 2001

(51) Int. Cl.[7] .............................. H02M 1/12; H02M 1/14
(52) U.S. Cl. ...................... 363/41; 363/98; 363/132; 363/137
(58) Field of Search ........................... 363/98, 41, 95, 363/96, 97, 132, 137

(56) References Cited

U.S. PATENT DOCUMENTS

| 5,627,447 | A | * | 5/1997 | Unsworth | 318/801 |
| 5,671,130 | A | * | 9/1997 | Kerkman et al. | 363/41 |
| 5,684,688 | A | * | 11/1997 | Rouaud et al. | 363/132 |
| 5,811,949 | A | * | 9/1998 | Garces | 318/448 |
| 5,917,721 | A | * | 6/1999 | Kerman et al. | 363/98 |

* cited by examiner

Primary Examiner—Bao Q. Vu
(74) Attorney, Agent, or Firm—Michael A. Jaskolski; William R. Walbrun; Alexander M. Gerasimow

(57) ABSTRACT

A method and apparatus for reducing distortion at the outputs of an inverter system, the apparatus including a polarity discriminator for determining the polarity of a current passing through an output terminal to a load, a compensator programmed with different upper and lower compensation values and controlled by the discriminator to provide the upper compensation value as an output when the current polarity is positive and providing the lower compensation value when the polarity is negative and a combiner for receiving a modulating signal and the compensation value provided by the compensator and mathematically combining the two signals to generate a modified modulating signal.

24 Claims, 9 Drawing Sheets

FIG. 1
Prior Art
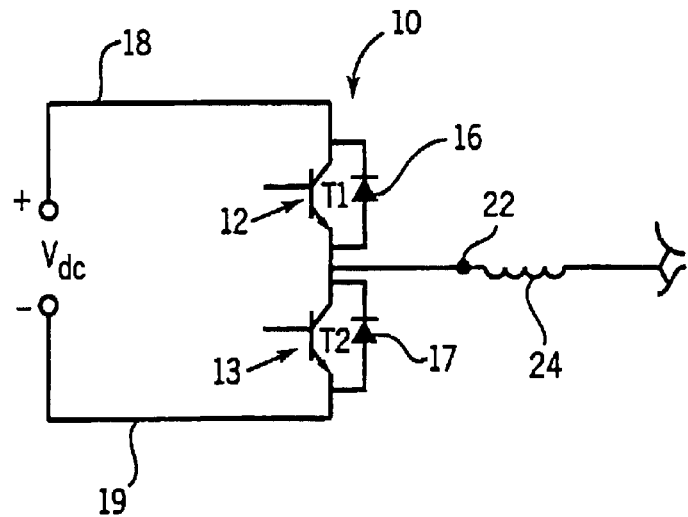
FIG. 2        Prior Art
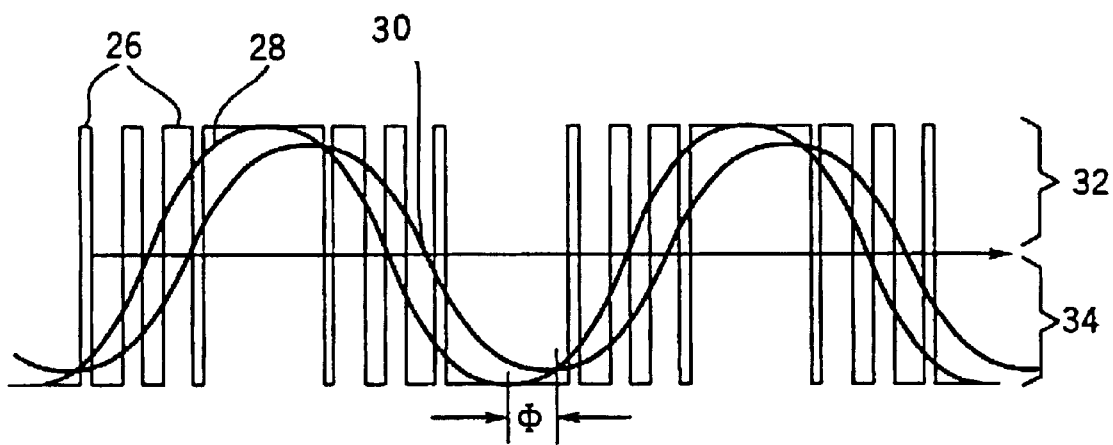

Iu and Iw phase currents
Standard DTC correction for I < 0   DTC = $2_\mu$sec
DTC for I > 0 is hardware defined at $2_\mu$sec
3 Hz   4kHz carrier   10 Hp inverter   10 Hp motor Iu and Iw phase currents
Standard DTC correction for I < 0   DTC = $2_\mu$sec
DTC for I > 0 is hardware defined at $2_\mu$sec
10 Hz   4kHz carrier   10 Hp inverter   10 Hp motor Iu and Iw phase currents
Standard DTC correction for I < 0   DTC = $2_\mu$sec
DTC for I > 0 is hardware defined at $2_\mu$sec
16 Hz   4kHz carrier   10 Hp inverter   10 Hp motor Iu and Iw phase currents
Modified DTC correction for I < 0 and I > 0 with reduced DTC values
I< 0 = add pulse time, I>0 = subtract pulse time
DTC = 0.5 $\mu$sec
3 Hz  4kHz carrier  10 Hp inverter  10 Hp motor Fig. 7 Motor Phase Current with Corerection at 3 Hz.

METHOD AND APPARATUS FOR COMPENSATING FOR DEVICE DYNAMICS IN INVERTER BASED CONTROL SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers and more particularly to a method and an apparatus for compensating for switching device drops and switching device dynamics in inverter systems.

One type of commonly designed motor is a three phase motor having three Y-connected stator windings. In this type of motor, each stator winding is connected to an AC voltage source by a separate supply line, the source providing time varying voltages across the stator windings. Often, an adjustable speed drive (ASD) will be positioned between the voltage source and the motor to control motor speed by controlling the stator voltages and frequency.

Many ASD configurations include a pulse width modulated (PWM) inverter consisting of a plurality of switching devices. Referring to FIG. 1, an exemplary PWM inverter leg 10 corresponding to one of three motor phases includes two series connected switches 12, 13 between positive and negative DC rails 18, 19 and two diodes 16, 17, a separate diode in inverse parallel relationship with each switch 12, 13. By turning the switches 12, 13 ON and OFF in a repetitive sequence, leg 10 receives DC voltage via rails 18 and 19 and provides high frequency voltage pulses to a motor terminal 22 connected to a stator winding 24. By firing the switching devices in a regulated sequence the PWM inverter can be used to control both the amplitude and frequency of voltage that is provided across winding 24.

Referring to FIG. 2, an exemplary sequence of high frequency voltage pulses 26 that an inverter might provide to a motor terminal can be observed along with an exemplary low frequency alternating fundamental or terminal voltage 28 and related alternating current 30. By varying the widths of the positive portions 32 of each high frequency pulse relative to the widths of the negative portions 34 over a series of high frequency voltage pulses 26, a changing average voltage which alternates sinusoidally can be generated. The changing average voltage defines the terminal voltage 28 that drives the motor. The terminal voltage 28 in turn produces a low frequency alternating current 30 that lags the voltage by a phase angle $\phi$.

The hardware that provides the firing pulses to the PWM inverter includes both a control board and a power board. The control board includes, among other components, a processor that receives a frequency command signal and various feedback signals and, in response thereto, provides command signals to the power board. The power board converts the command signals to modulating signals. Among other things, the power board typically includes a comparator that receives each of at least one modulating signal and a carrier signal for comparison. Referring to FIG. 3(a), exemplary modulating and carrier waveforms used by a power board to generate the firing pulses for leg 10 are illustrated. As well known in the art, a carrier waveform 36 is perfectly periodic and operates at what is known as a carrier frequency. A modulating voltage waveform 38 generally and ideally is sinusoidal, having a much greater period than carrier waveform 36.

Referring also to FIGS. 3(b) and 3(c), an ideal upper signal 40 and an ideal lower signal 42 generated by a PWM comparator comparing the signals of FIG. 3(a) and that may control the upper and lower switches 12, 13 respectively, are illustrated. The turn-on times tu1, tu2 and turn-off times to 1, to 2 of the upper and lower signals 40, 42, respectively, come from the intersections of the modulating waveform 38 and the carrier waveform 36.

When the modulating waveform 38 intersects the carrier waveform 36 while the carrier waveform has a positive slope, the upper signal 40 goes OFF and lower signal 42 goes ON. On the other hand, when the modulating waveform 38 intersects the carrier waveform 36 while the carrier waveform has a negative slope, the upper signal 40 goes ON and the lower signal 42 goes OFF. Thus, by comparing the carrier waveform 36 to the modulating waveform 38, the states of the upper and lower signals 40, 42, respectively, can be determined.

While the modulating and carrier signals are referred to as waveforms in order to simplify understanding of this explanation, in reality, each of the waveforms is a digital count that represents a corresponding waveform. For instance, the modulating waveform may be converted into a count that oscillates within a range between a first or minimum modulating count equal to or greater than zero and a second or maximum modulating count. Where the modulating waveform is sinusoidal, the modulating count changes in a sinusoidal time-varying fashion indicative of the waveform. In this case, a carrier count oscillates in a linear time varying fashion from zero to a maximum carrier count $T_{cmax}$ that is equal to or greater than the maximum modulating count and back to zero during each carrier cycle. The comparator compares the modulating count with the carrier count and when the modulating count is greater than the carrier count, causes the corresponding upper and lower switches to be turned ON and OFF, respectively, and when the modulating count is less than the carrier count, causes corresponding upper and lower switches to be turned OFF and ON, respectively. Because the modulating count value determines the ratio of switch ON times to PWM period duration (i.e., carrier cycle period), the modulating count is also referred to as a duty cycle Ts.

When the duty cycle count is less than one-half the maximum carrier count, the resulting terminal voltage is negative because the corresponding lower switch is ON for more than half the PWM period. Similarly, when the duty cycle count is greater than one-half the maximum carrier count, the resulting terminal voltage is positive because the corresponding upper switch is ON for more than half the PWM period.

Referring also to FIGS. 2 and 3(d), an ideal high frequency voltage pulse 26 resulting from the ideal upper and lower signals 40, 42 in FIGS. 3(b) and 3(c) that might be provided at terminal 22 can be observed. When the upper signal 40 is ON and the lower signal 42 is OFF, switch 12 allows current to flow from the high voltage rail 18 to motor terminal 22 thus producing the positive phase 44 of pulse 26 at motor terminal 22. Ideally, when the upper signal 40 goes OFF and the lower signal 42 goes ON, switch 12 immediately turns OFF and switch 13 immediately turns ON connecting motor terminal 22 and the low voltage rail 19 producing the negative phase 46 of pulse 26 at terminal 22. Thus, the ideal high frequency voltage pulse 26 is positive when the upper signal 40 is ON and is negative when the lower signal 42 is ON. Also, ideally, the low frequency terminal voltage and corresponding current (see FIG. 2) should completely mirror the modulating waveforms.

Unfortunately, these ideal switch operating conditions do not occur as there are several switch and inverter operating phenomenon that cause terminal voltage distortions. For example, one problem with PWM inverters has been that the high frequency terminal voltage pulses (see 26 in FIG. 2) cause ripple in the resulting low frequency phase voltages and currents. This ripple distortion has generally been addressed by either providing line filters that tend to smooth the ripple or by adopting faster switching technology. Elaborate filters are bulky and expensive and therefore are not preferred. Current inverter switching technology has advanced rapidly and modern switches are now capable of changing state in as little as several tens of nano-seconds (e.g., 50 nsec.). For this reason, recent inverter designs have typically adopted high speed switching configurations to reduce ripple distortion.

One other relatively well understood and therefore, not surprisingly, generally well compensated distortion phenomenon, is referred to as inverter switch delay. Control schemes for compensating for switch delays are generally referred to as dead time compensation (DTC) schemes. Exemplary DTC schemes are described in U.S. Pat. No. 5,811,949 and U.S. Pat. No. 5,917,721.

While switch delays and ripple distortion are well understood and DTC and other schemes have been developed that generally minimize terminal current and voltage distortion due to turn on delays and ripple, unfortunately, experience has shown that even after DTC has been implemented and fast switching technology has been adopted, terminal voltages and currents still include appreciable distortion. To this end, referring to FIG. 4, two phase terminal currents are illustrated that were generated with a 10 hp industrial drive with full DTC, with a 3 Hz modulating frequency and a 4 kHz carrier frequency. Clearly, under these conditions, despite full dead time compensation, terminal current distortion is relatively large and would be unacceptable for many applications.

Several systems have been developed that employ several feedback loops and complex processor algorithms to compensate for the distortion illustrated in FIG. 4. While suitable for certain applications, unfortunately, the processors required to perform the compensation algorithms are often relatively expensive and therefore are not useable in low end control systems.

Thus it would be advantageous to have a control methodology and system that is relatively simple and inexpensive to implement that could mitigate at least the lion's share of distortion illustrated in FIG. 4.

BRIEF SUMMARY OF THE INVENTION

In order to best mitigate the affects of a distortion source first the source and the magnitude of the distortion has to be identified. To this end, control board error has been studied in great detail and, while control board error occurs, the magnitude of control board error is to small to account for the distortion illustrated in FIG. 4.

To gain a better understanding of the source of the disturbances illustrated in FIG. 4 experiments were performed using the system employed to generate the waveforms of FIG. 4 with different operating frequencies. To this end, FIGS. 5 and 6 illustrate two phase current waveforms with 10 and 16 Hz operating frequencies, respectively. Clearly, current distortion decreases as the operating frequency is increased. When distortion changes as a function of operating frequency experience has shown that likely sources of distortion include the power board and or the power structure.

More specifically, it has been recognized that, despite seemingly identical upper and lower inverter components in a typical inverter, the upper and lower components operate differently during switching and therefore have slightly different propagation delays and device dynamics (i.e., switching ramp ON and OFF times). At low operating frequencies (e.g., 2 Hz), the proportion of applied voltage attributed to propagation delays and device dynamics is relatively large when compared to the proportion at high operating frequencies—hence the varying levels of distortion illustrated in FIGS. 4, 5 and 6.

To this end, referring to FIG. 7, a carrier signal 36, an exemplary high frequency modulating signal $38_H$ and an exemplary low frequency modulating signal $38_L$ are illustrated. For the purposes of this explanation it should be assumed that each time a modulating signal (e.g., $38_H$ or $38_L$) and the carrier waveform 36 intersect, an inverter switching sequence or state change occurs. Thus, at each of times T1 and T4, switching sequences occur corresponding to signal $38_L$. Similarly, at each of times T2 and T3 switching sequences occur corresponding to signal $38_H$, etc. It should also be assumed that each time a switching sequence occurs some device dynamics error due to imperfect switching characteristics occurs. During period $T_A$, while each modulating signal results in two switching sequences and hence errors of similar magnitudes, because the period during which high frequency modulating signal $38_H$ is below carrier waveform 36 is shorter than the period during which low frequency modulating signal $38_L$ is below carrier waveform 36 and, because resulting pulses (see again FIG. 3d) are positive when modulating waveforms are above carrier waveform 36, the magnitude of the voltage resulting from high frequency waveform $38_H$ is greater than the voltage magnitude resulting from low frequency waveform $38_L$. Thus, during period $T_A$, the ratio of switching errors to voltage magnitude corresponding to high frequency waveform $38_H$ is less than the ratio of switching errors to voltage magnitude corresponding to low frequency waveform $38_L$. This ratio difference partially explains the varying levels of distortion at different operating frequencies as illustrated in FIGS. 4 through 6.

To mitigate the distortion illustrated in FIGS. 4, 5 and 6, the present invention includes a device dynamics compensator that is useable to roughly adjust the modulating signals. More specifically, the present invention includes a device dynamics compensator including a polarity discriminator, several two pole switches (one switch per phase) and a memory. Two separate values are stored in the memory including upper and lower compensation values where the upper and lower values are typically different. The upper and lower values are linked to separate inputs of the switch. The discriminator receives current feedback signals from each of three load phases and, for each phase, determines the current polarity (i.e., positive or negative) thereby generating polarity signals. A separate polarity signal controls each switch such that, when a polarity is positive, a corresponding switch provides the upper compensation value to the switch output and, when the polarity is negative, a corresponding switch provides the lower compensation value.

The output compensation values are provided to summers which mathematically combine the compensation values with command modulating signals that have already been compensated in a conventional fashion for deadtime. More specifically, each summer adds the received values.

With respect to the upper and lower compensation values, the upper value is generally associated with the upper half of the PWM inverter while the lower value is generally associated with the lower half of the PWM inverter thereby reflecting disparate propagation delays and device dynamics attributable to the upper and lower inverter devices, hence the "upper" and "lower" labels for the compensation values.

To identify the compensation values, the invention also includes a commissioning procedure described below.

BRIEF DESCRIPTION OF THE SEVERAL VIEWS OF THE DRAWINGS

FIG. 1 is a schematic diagram illustrating switching components in one leg of a PWM inverter;

FIG. 2 is a graph illustrating exemplary high frequency PWM voltage pulses, an exemplary low frequency alternating voltage and a related low frequency alternating current;

DETAILED DESCRIPTION OF THE INVENTION

Figure 8:
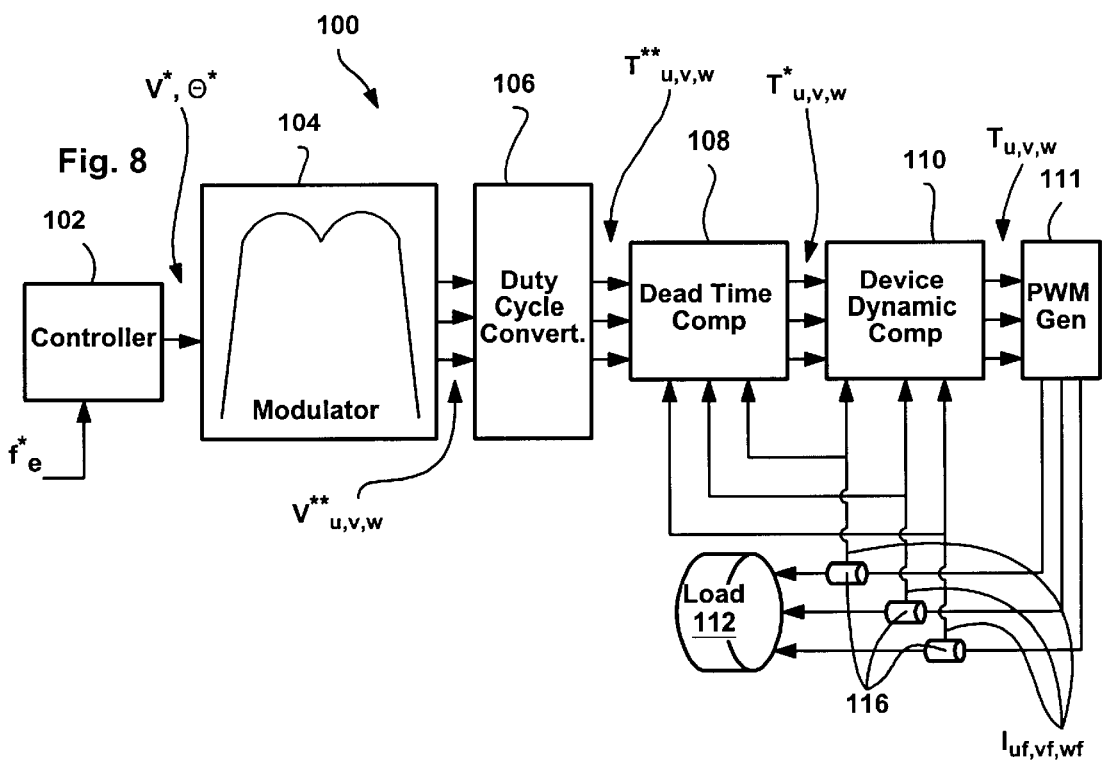
FIG. 8 is a schematic diagram illustrating a control system according to a first embodiment of the invention.

FIG. 8 shows a block diagram of an exemplary inventive drive system 100 including a controller 102, a modulator 104, a duty cycle converter 106, a deadtime compensator 108, a device dynamic compensator 110, a PWM generator 111, three current sensors collectively identified by numeral 116 and an exemplary load 112. Controller 102 receives a command signal $f_e^*$ and uses the command signal to generate command voltage and angle signals V* and θ*, respectively. The voltage and angle command signals are provided to modulator 104 which uses those signals to generate three-phase voltage modulating signals $V_u^{}, V_v^{}$ and $V_w^{}$. The three-phase voltage modulating signals are provided to duty cycle converter 106 which generates three-phase command duty cycle count values $T_u^{}, T_v^{}$ and $T_w^{}$, a separate duty cycle count value corresponding to each of the three received voltage modulating signals. The command duty cycle counts $T_u^{}, T_v^{}$ and $T_w^{**}$ are provided to deadtime compensator 108.

In addition to receiving the duty cycle counts, compensator 108 also receives three current feedback signals $I_{uf}, I_{vf}$ and $I_{wf}$ from the three current sensors 116, a separate current sensor 116 linked to each of three supply lines that provide power to load 112. Deadtime compensator 108 uses the current feedback signals to determine how to modify the command duty cycle signals $T_u^{}, T_v^{}$ and $T_w^{**}$ to compensate for deadtime effects in any manner well known in the art. Deadtime compensator 108 generates modified duty cycle signals $T^*_u, T^*_v$ and $T^*_w$ which are provided to device dynamic compensator 110.

Referring still to FIG. 8, device dynamic compensator 110 receives the modified duty cycle signals $T^*_u, T^*_v$ and $T^*_w$ and modifies those signals to provide compensated duty cycle signals $T_u, T_v$ and $T_w$. Compensated duty cycle signals $T_u, T_v$ and $T_w$ are provided to PWM generator 111.

Generator 111, as described above, compares the compensated duty cycle signals $T_u, T_v, T_w$ to a carrier signal and generates firing pulses that cause an inverter to generate high frequency voltage pulses on the three lines linked to load 112. The high frequency voltage pulses cause a fundamental low frequency alternating voltage at the frequency of the modulating waveforms and hence cause currents to pass through the load lines. The currents through the load lines are sensed, as indicated above, by sensors 116 and are provided back to compensators 108 and 110. As well known in the art, while three sensors 116 are illustrated, some configurations may only include two sensors for sensing the current in two of the three system phases and the two signals generated may be used to identify the third phase signal.

Figure 9:
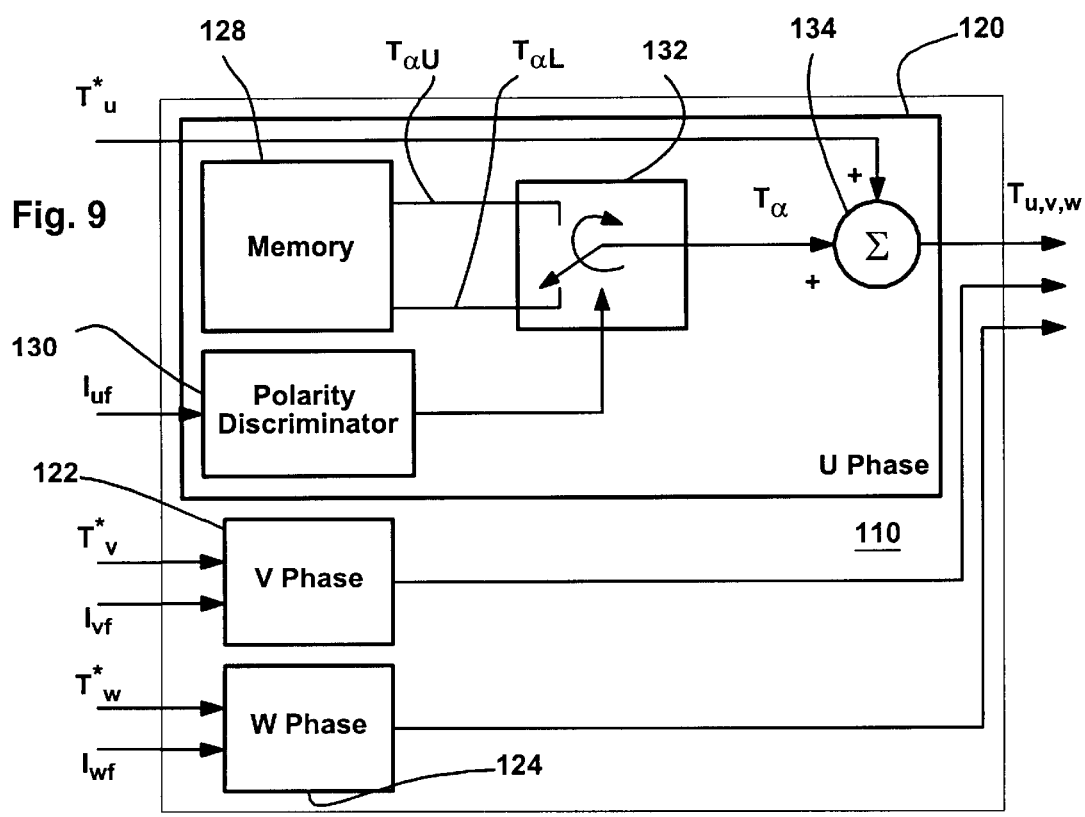
FIG. 9 is a detailed schematic diagram of the device dynamic compensator of FIG. 8.

Referring to FIG. 9, an exemplary device dynamics compensator 110 is illustrated in more detail. Referring also to FIG. 8, compensator 110 includes three separator modules 120, 122 and 124, a separate compensator module 120, 122, 124 for each of the three phases U, V and W of the control system illustrated in FIG. 8. Each of the compensator modules 120, 122 and 124 is essentially identical to the other compensator modules and therefore only compensator module 120 will be described here in detail. Compensator module 120 includes a memory 128, a polarity discriminator 130, a single pole double throw switch 132 and a summer 134. Memory 128 is programmed to include first and second compensation values also referred to as upper and lower compensation values $T_{\alpha U}$ and $T_{\alpha L}$, respectively. Upper value $T_{\alpha U}$ is negated before storing. Memory 128 is linked to switch 132 such that each of the upper and lower compensation values $-T_{\alpha U}$ and $T_{\alpha L}$, respectively, are linked to separate ones of the inputs to switch 132. The output of switch 132 is provided as an input to summer 134. In addition, summer 134 also receives the U-phase modified duty cycle signal $T_u^*$ and adds the modified duty cycle signal $T_u^*$ and the value received from switch 132 to provide the compensated duty cycle signal $T_u$.

Referring still to FIG. 9, polarity discriminator 130 receives the U-phase current feedback signal $I_{uf}$ and determines the polarity of the received signal. Thus, discriminator 130 provides an output signal that indicates that the received current feedback signal $I_{uf}$ is either positive or negative. Where the feedback signal $I_{uf}$ is positive, discriminator 130 links the output of switch 132 to a first of the switch inputs thereby passing the upper compensation value $-T_{\alpha U}$ to the output of switch 132 as the compensation value $T_\alpha$. Similarly, where the feedback current $I_{uf}$ is negative, discriminator 130 causes switch 132 to link the output of switch 132 to the second switch input thereby passing lower compensation value $T_{\alpha L}$ to summer 134. Thus, either upper compensation value $-T_{\alpha u}$ or lower compensation value $T_{\alpha L}$ is provided to summer 134 as a compensation signal and added to the modified duty cycle signal $T_u^*$ to generate the compensated duty cycle signal $T_u$. As indicated above, each of modulators 122 and 124 operates in a fashion similar to that described above with respect to module 120, albeit using signals corresponding to the other two system phases.

Prior to explaining a commissioning procedure for identifying the $T_{\alpha u}$ and $T_{\alpha L}$ values a bit of theory is instructive. In the case of an ideal inverter driven by a commissioning current regulator having a current feedback loop, when excited using two different current commands $I^*_L$ and $I^*_H$, the ratio of the current regulator output voltages $V_H^*V_L^*$ be expressed as:

$$\frac{V_H^*}{V_L^*} = \frac{I_H}{I_L} \qquad \text{Eq. 1}$$

As well known in the art, in reality, when a large current value is commanded, the resulting current regulator output voltage is very close to the ideal output voltage. Thus, in Equation 1, because both the high and low current values $I^*_L$ and $I^*_H$ can be commanded during a commissioning process and therefore are known and the high voltage $V_H^*$ resulting from a high current is essentially ideal and measurable, the only unknown in Equation 1 is the ideal low voltage value $V_L$. Therefore Equation 1 can be reshuffled to yield Equation 2:

$$V_L^* = V_H^* \frac{I_L}{I_H} \qquad \text{Eq. 2}$$

It is also true that, in reality, at low command current levels, the current regulator output voltage $V_{Ldist}$ exceeds the ideal terminal voltage $V_L^*$ by an amount equal to the parasitic distortion $\Delta V_{Ldist}$ that occurs within the system such that:

$$V_{Ldist} = V_L^* + \Delta V_{Ldist} \qquad \text{Eq. 3}$$

Therefore, Equations 2 and 3 can be combined to provide equation 4 that can be solved to identify a parasitic distortion value $\Delta V_{Ldist}$:

$$\Delta V_{Ldist} = V_{Ldist} - V_H^* \frac{I_L}{I_H} \qquad \text{Eq. 4}$$

The distortion value $\Delta V_{Ldist}$ can be converted into a duty cycle $T_e$ by solving the following equation:

$$\frac{T_e}{T_s} = \frac{V_{Ldist}}{V_{dc}} \qquad \text{Eq. 5}$$

where Ts is a carrier period and Vdc is a DC bus voltage.

In order to identify distinct $T_{\alpha U}$ and $T_{\alpha L}$ values and thereby account for asymmetries in the upper and lower portions of the inverter, the process described above is ideally performed twice, a first time with positive command currents and a second time with negative command currents. Where positive command currents are used to drive the system, the resulting $T_e$ value is the $T_{\alpha U}$ value and where negative currents are used the $T_{\alpha L}$ value results.

According to even a simpler commissioning procedure, the process described above may only be performed once using either positive or negative command currents and the resulting value may be used as both the $T_{\alpha U}$ and $T_{\alpha L}$ values. In this case the assumption is made that the variances between the upper and lower halves of the inverter are negligible.

Figure 13:
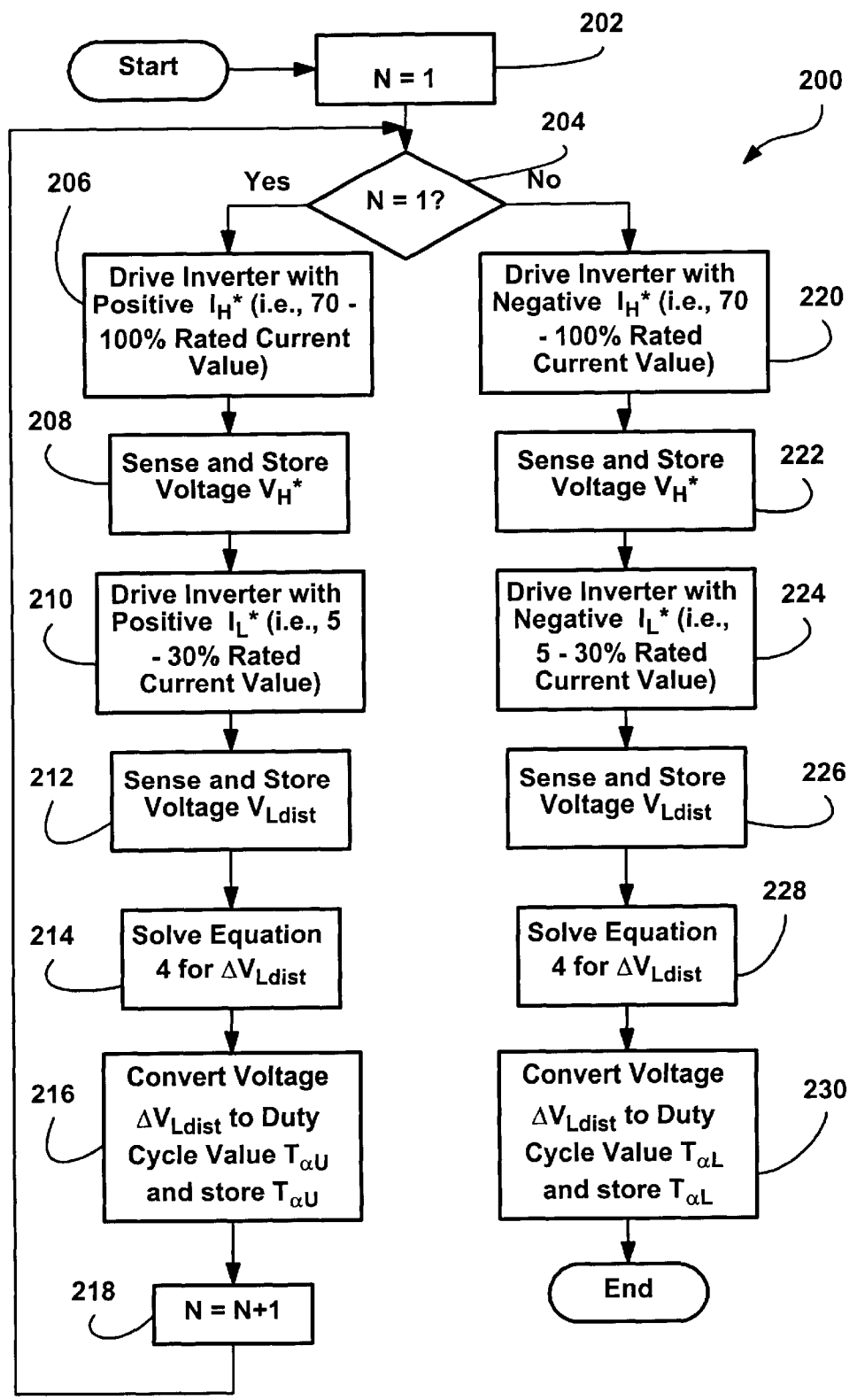
FIG. 13 is a flow chart illustrating a commissioning method according to the present invention.

Referring now to FIG. 13, an exemplary method 200 consistent with the discussion above for determining the upper and lower compensation values $T_{\alpha U}$ and $T_{\alpha L}$, respectively, is illustrated. The method of FIG. 13 is an automated method that can be performed by a processor essentially without user input. However, it should be appreciated that a semi-automated method may also be employed at the factory or by the user where system inputs are adjusted and upper and lower compensation values identified when compensation results are sufficient for the user's purposes. Prior to performing the process illustrated in FIG. 13, a commissioning current regulator having a current feedback loop is linked to and for driving a system inverter during the commissioning process.

Referring also to FIGS. 8 and 9, at block 202 a counter N is set which enables a system processor to distinguish between commissioning steps corresponding identification of the upper compensation value $T_{\alpha U}$ and the lower compensation value $T_{\alpha L}$. To this end, counter N is initially set equal to one.

Continuing, at block 204, counter N is compared to 1 and, where N is equal to 1 control passes to block 206 and blocks thereafter to determine upper value $T_{\alpha U}$. Thus, because N is initially 1, control first passes to block 206. At block 206 a current regulator is commanded with a positive high DC current $I^*_H$. For example, high current value $I^*_H$ may be anywhere within the range of 70 to 100% of the rated current value.

At block 208 the resulting high voltage $V^*_H$ generated by the current regulator is sensed and the value $V^*_H$ is stored. Next, at block 210 the regulator is commanded with a relatively low positive current $I^*_L$. For example, the low current value may be anywhere within the range of 5 to 30% of the rated current value. At block 212 the regulator output voltage $V_{Ldist}$ is sensed.

Continuing, at block 214 the $V_{Ldist}$ value and the stored high voltage $V^*_H$ value as well as the high and low current values $I^*_H$ and $I^*_L$, respectively, are plugged into Equation 4 above to identify the $\Delta V_{Ldist}$ value. Thereafter, at block 216 the $\Delta V_{Ldist}$ value is plugged into Equation 5 to identify the upper compensation value $T_{\alpha U}$. Also, at block 216, the negative of $T_{\alpha U}$ value is stored for use during subsequent normal operations.

At block 218, counter N is incremented by 1 indicating that, from that point on, the commissioning steps are carried out to determine the lower compensation value $T_{\alpha L}$. Thereafter control passes back up to block 204 where counter N is again compared to value 1. Here, because counter N has been incremented to 2, control passes to block 220 and blocks thereafter to determine lower value $T_{\alpha L}$. At block 220 the regulator is driven with a negative high DC current $I^*_H$. Again, the high current magnitude may be anywhere within the range of 70 to 100% of the rated current value.

At block 222 the resulting high voltage $V^*_H$ generated by the current regulator is sensed and the value $V^*_H$ is stored. Next, at block 224 the inverter is driven with a relatively low negative current $I^*_L$. For example, the low current value may be anywhere within the range of 5 to 30% of the rated current value. At block 226 the regulator output voltage $V_{Ldist}$ is sensed.

Continuing, at block 228 the $V_{Ldist}$ value and the stored high voltage $V^*_H$ value as well as the high and low current values $I^*_H$ and $I^*_L$, respectively, are plugged into Equation 4 above to identify the $\Delta V_{Ldist}$ value. Thereafter, at block 230 the $\Delta V_{Ldist}$ value is plugged into Equation 5 to identify the lower compensation value $T_{\alpha L}$. Also, at block 230, the $T_{\alpha L}$ value is stored for use during subsequent normal operations. This completes the exemplary commissioning process.

Figure 3A:
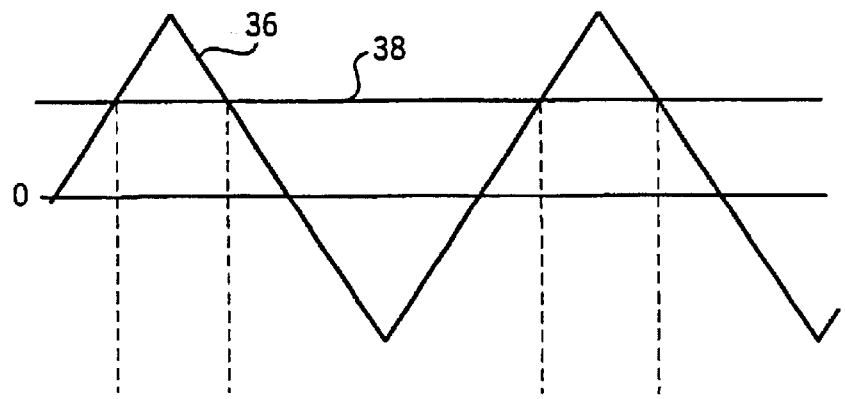
FIG. 3a is a graph illustrating an exemplary modulating signal and an exemplary carrier signal.
Figure 3B:
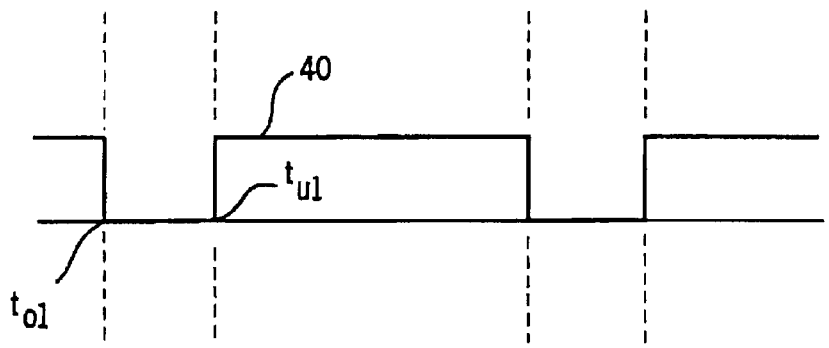
FIGS. 3b and 3c illustrate firing pulses provided to a PWM inverter, and corresponding to FIG. 3a and FIG. 3d is a graph illustrating a high frequency voltage pulse similar to the high frequency pulses of FIG. 2.
Figure 3C:
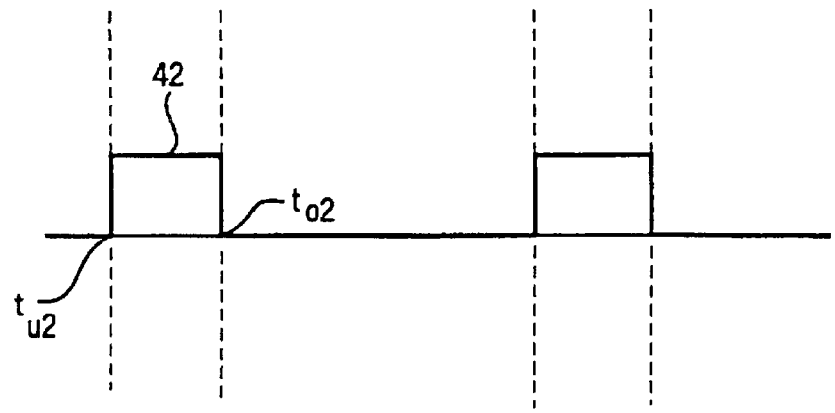
Figure 3D:
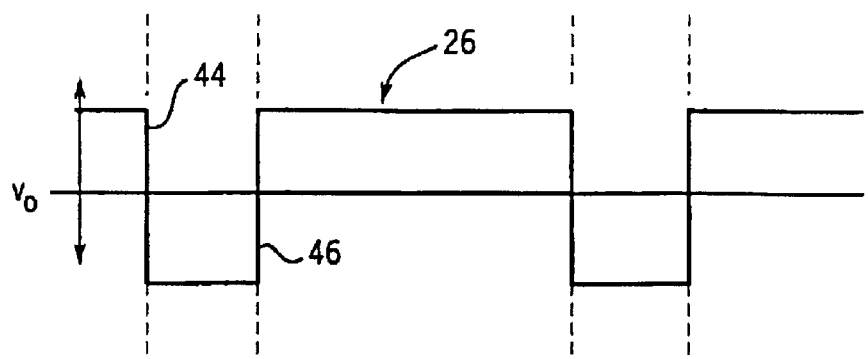
Figure 4:
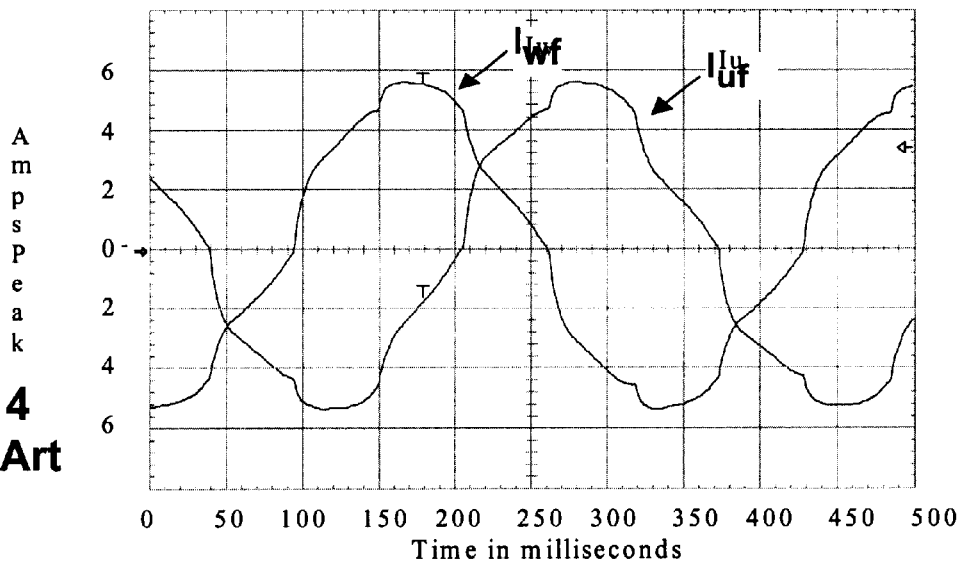
FIG. 4 is a graph illustrating two feedback load currents where an operating frequency was set to 3 Hz.
Figure 5:
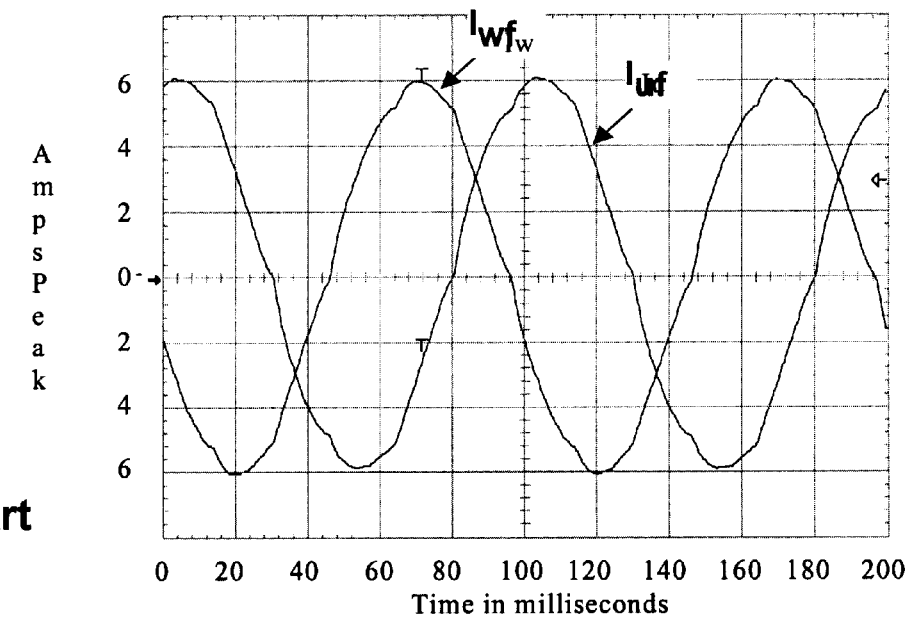
FIG. 5 is a similar to FIG. 4, albeit where the currents were generated with a 10 Hz operating frequency.
Figure 6:
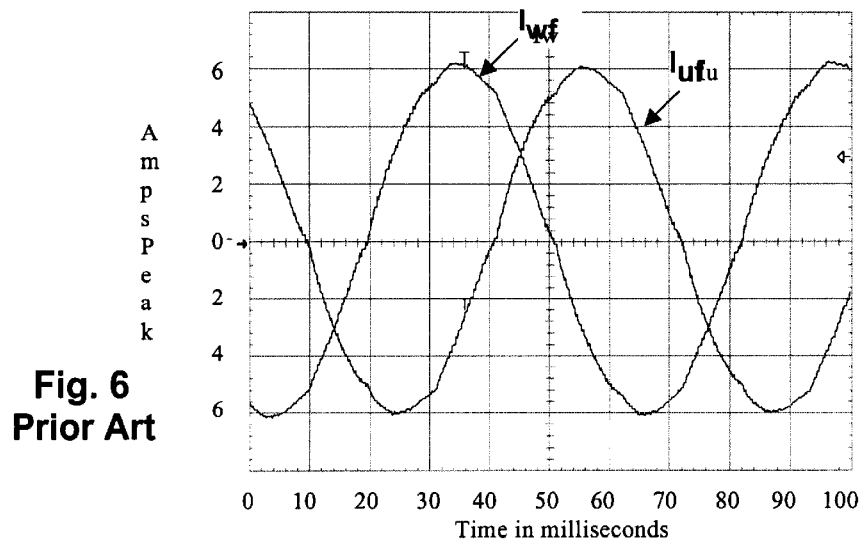
FIG. 6 is similar to FIG. 4, albeit where the operating frequency was set to 16 Hz.
Figure 7:
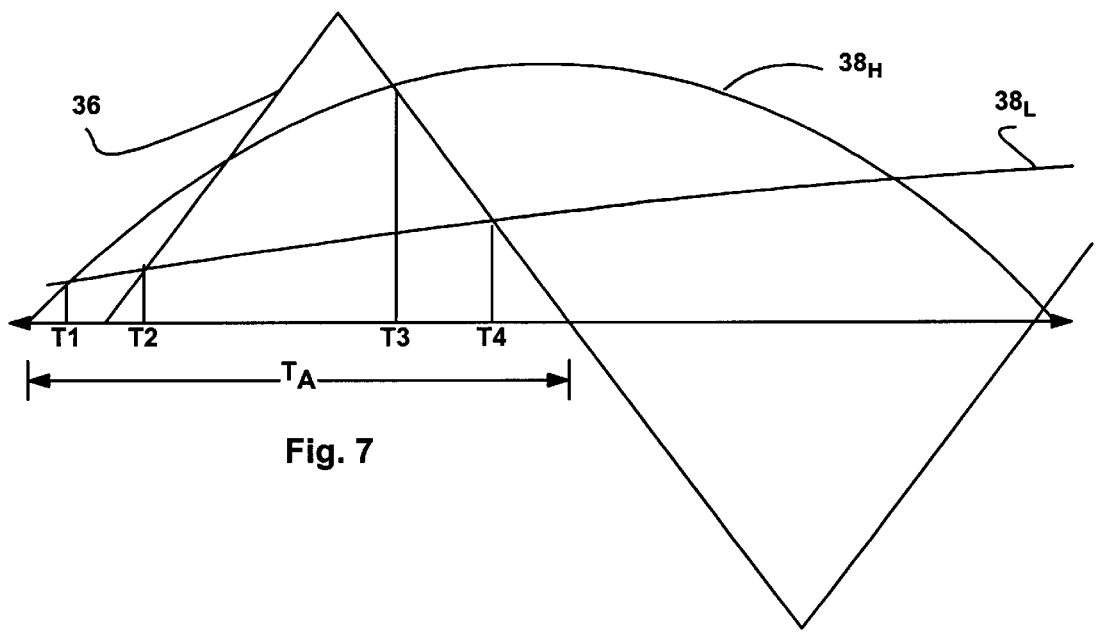
FIG. 7 is a graph similar to the graph of FIG. 3a, albeit illustrating two modulating signals of different frequencies.
Figure 12:
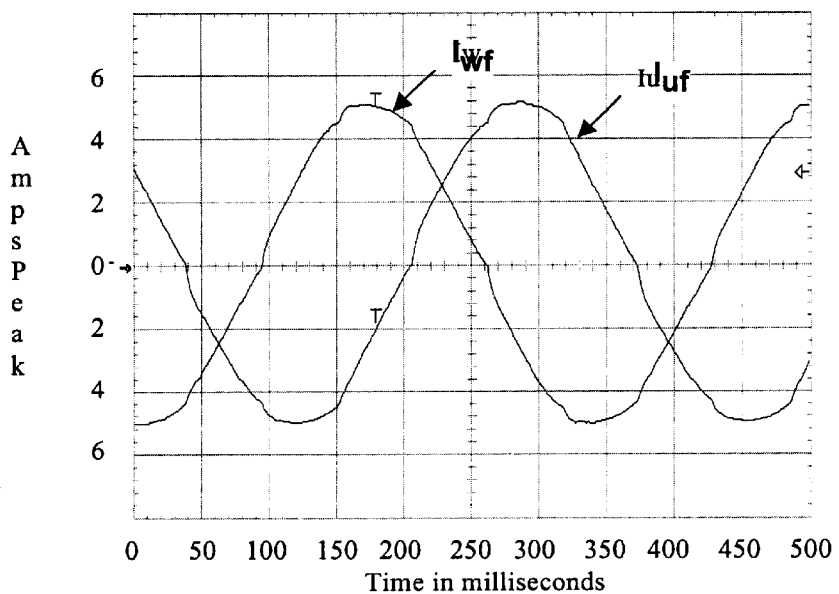
FIG. 12 is similar to FIG. 4, albeit illustrating currents generated with the present invention-employed.

Referring now to FIG. 12, a plot of U-phase and W-phase feedback currents $I_{uf}$ and $I_{wf}$ is illustrated that were created using the same system used to create the waveforms in FIG. 4, except that the device dynamic compensator 110 illustrated and described above was employed after a suitable commissioning procedure had been completed. Comparing FIGS. 4 and 12, it should be appreciated that the device dynamic compensator 110 reduced load current distortion appreciably.

Figure 10:
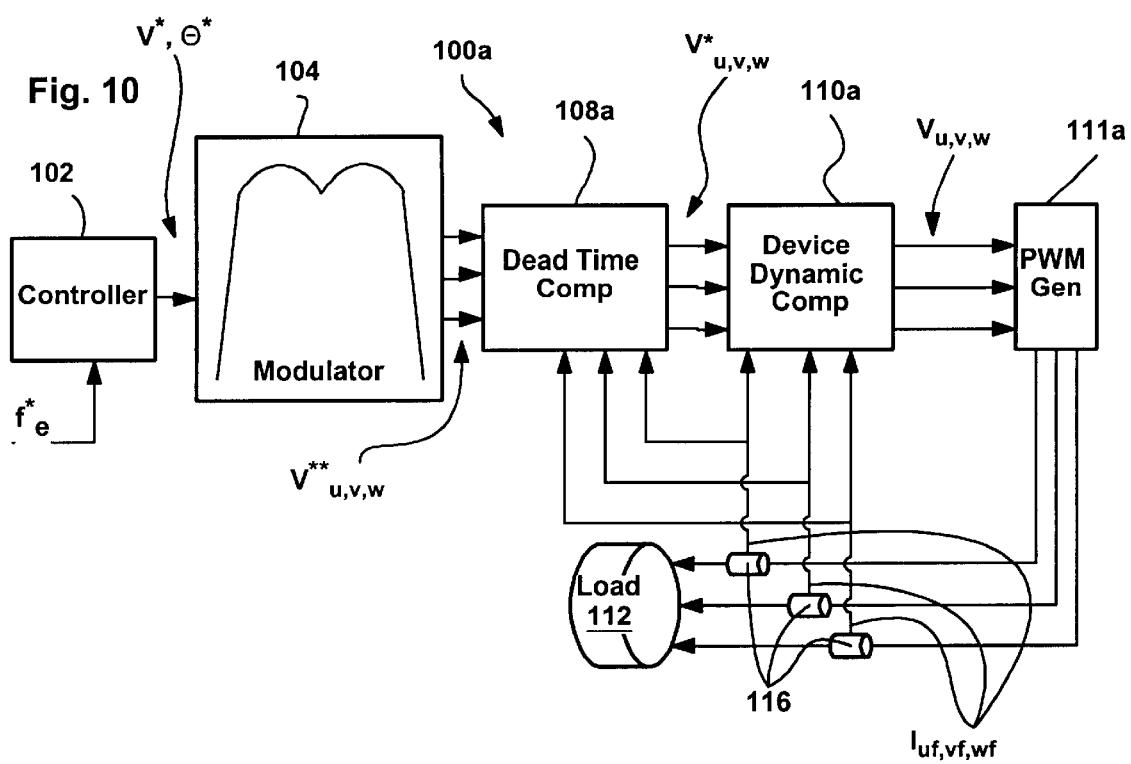
FIG. 10 is similar to FIG. 8, albeit illustrating a second inventive control system.

Referring now to FIG. 10, a second embodiment 100a of the invention is illustrated. In FIG. 10, many of the components are essentially identical to those described with respect to FIG. 8, are identified by similar numbers and will not be described again here in detail. To this end, controller 102, modulator 104, sensors 116 and load 112 are similar to components described above. Deadtime compensator 108a is different than the deadtime compensator 108 described above in that compensator 108a modifies modulating signals as opposed to modifying duty cycles and generates modified modulating signals $V_u^*, V_v^*$ and $V_w^*$ that are provided to device dynamic compensator 110a. Similarly, generator 111a is different than generator 111 described above in that generator 111a receives and employs compensated modulating signals $V_u, V_v$ and $V_w$ instead of employing duty cycle signals to generate voltages and currents on the load supply lines.

Figure 11:
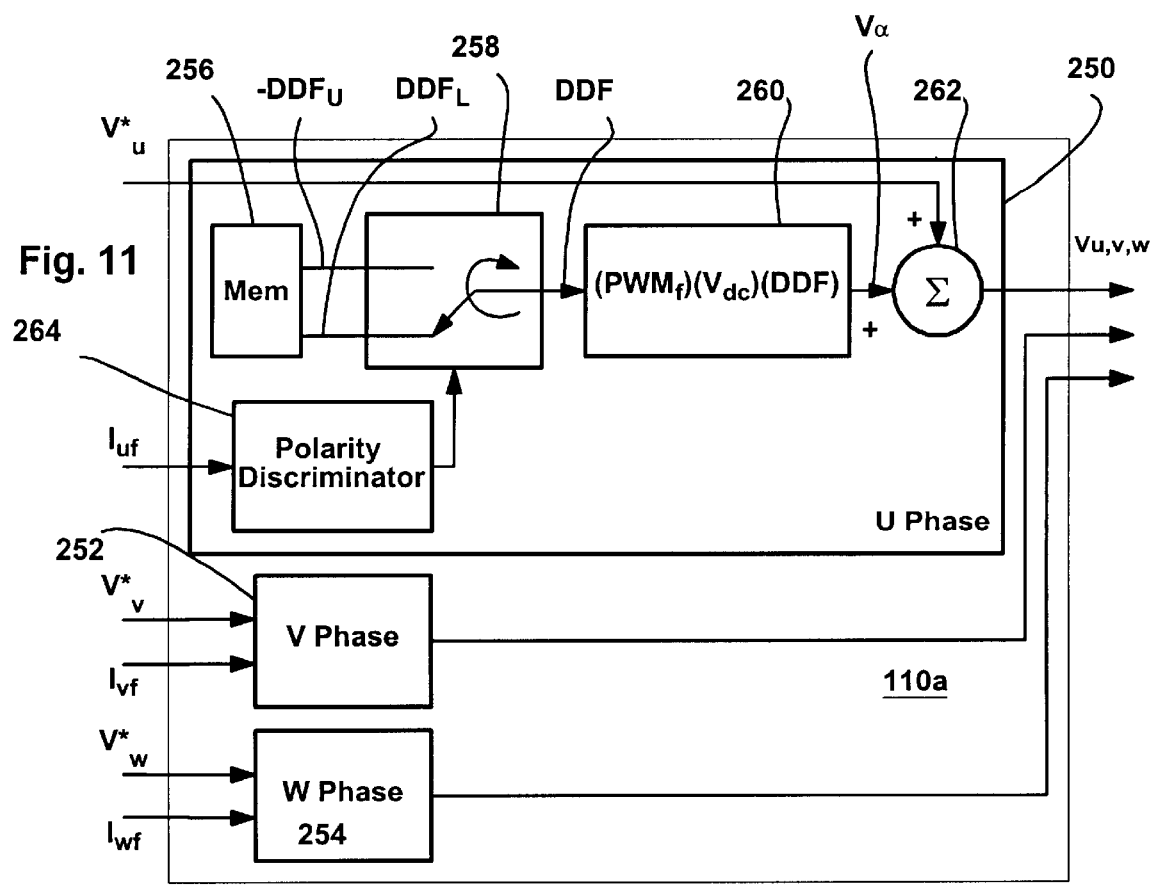
FIG. 11 is similar to FIG. 9, albeit illustrating an exemplary device dynamic compensator used in the system of FIG. 10.

Referring still to FIG. 10 and also to FIG. 11, device dynamic compensator 110a in FIG. 10 is illustrated in greater detail in FIG. 11. Compensator 110a includes three compensator modules 250, 252 and 254. Again, each of modules 250, 252 and 254 is essentially identical in construction and operation and therefore, only module 250 will be described here in detail. Suffice it to say that a separate module 250, 252, and 254 is provide for each of the three separate phases in system 100a in FIG. 10.

Referring still to FIGS. 10 and 11, module 250 includes a memory 256, a single pole double throw switch 258, a gain module 260, a summer 262 and a polarity discriminator 264. Memory 256 is programmed with upper and lower device dynamic factors or compensation values $-DDF_U$ and $DDF_L$, respectively, the upper and lower values provided at the first and second inputs of switch 258, respectively. The output of switch 258 provides one of the upper or lower values $DDF_U$ or $DDF_L$, depending on switch 258 state, as a compensation value or a device dynamic factor DDF to gain module 260. Gain module 260 multiplies the current PWM frequency $PWM_f$ by the DC bus voltage value $V_{dc}$ and multiplies the result by the compensation value DDF and provides its output as a compensation voltage $V_\alpha$ to summer 262. Summer 262 also receives the modified U-phase modulating voltage $V_u^*$ and adds the two received signals to provide the compensated U-phase modulating signal $V_u$.

As above, the polarity discriminator 264 receives the U-phase current feedback $I_{uf}$ and controls switch 258 and a function of the polarity of that feedback signal. Where the feedback current signal $I_{uf}$ is positive, discriminator 264 causes switch 258 to provide the upper value $-DDF_U$ at the switch output. Where the polarity of feedback current $I_{uf}$ is negative, discriminator causes switch 258 to provide the low value $DDF_L$ at its output. Once again, modules 252 and 254 operate in a similar fashion to that described above with respect to module 250 except that modules 252 and 254 operate on the V and W phases, respectively, to generated compensated V and U-phase modulating signals $V_v$ and $V_w$, respectively.

Referring again to FIG. 13, a portion of the commissioning procedure in FIG. 13 can be used to determine $DDF_U$ and $DDF_L$ values. To this end, at block 214, after value $\Delta V_{Ldist}$ is identified, the following equation can be solved to convert value $\Delta V_{Ldist}$ to a compensation value $DDF_U$:

$$DDF_U = \frac{\Delta V_{Ldist}}{(PWM_f)(V_{dc})} \qquad \text{Eq. 6}$$

Thereafter, at block 216, value $DDF_U$ is stored and N is again incremented at block 218. Similarly, at block 228 Equation 6can be solved for value $DDF_L$ and the resulting value stored for subsequent use. Experiments have shown that the results of a properly commissioned system constructed in accordance with FIGS. 10 and 11 are similar to that illustrated in FIG. 12.

It should be understood that the methods and apparatuses described above are only exemplary and do not limit the scope of the invention, and that various modifications could be made by those skilled in the art that would fall under the scope of the invention. For example, in cases where precise compensation is not necessary the commissioning procedures described above could be performed at a factor for each type of system once and the resulting compensation values could then be programmed for all systems of the particular type. However, where precision is relatively important, commissioning should be performed within the field after a specific load has been linked to the system.

To apprise the public of the scope of this invention, the following claims are made.

What is claimed is:

1. An apparatus for reducing distortion at the output terminals of an inverter drive system, wherein the system includes an N phase inverter and an inverter controller, the inverter including a plurality of switches that link positive and negative DC buses to N output terminals, a separate terminal for each of the inverter phases, the controller receiving N modulating signals and a carrier signal and comparing the modulating signals and the carrier signals to generate firing pulses to control the switches, the apparatus comprising, for each of the N phases:

a polarity discriminator for determining the polarity of the current passing through the phase output terminal;

a device dynamics compensator including upper and lower compensation values where the upper compensation value is different than the lower compensation value, the compensator linked to and receiving the polarity signal from the discriminator and, when the polarity is positive, providing the upper compensation value as an compensation signal and, when the polarity is negative, providing the lower compensation value as the compensation signal; and a combiner for receiving the modulating signal and the compensation signal and mathematically combining the modulating and compensation signals.

2. The apparatus of claim 1 wherein the modulating signals are duty cycle counts and the compensation values are count values.

3. The apparatus of claim 1 wherein the modulating signals are voltages and the compensation values are voltage magnitude values.

4. The apparatus of claim 1 wherein the upper compensation value is greater than the lower compensation value.

5. The apparatus of claim 1 wherein each combiner includes a summer and the summers mathematically combine by adding the modulating signals to corresponding compensation signals.

6. A method for identifying compensation values to be used to reduce distortion at the output terminals of an inverter drive system linked to a load wherein the system includes an N phase inverter, a current regulator and a modulator, the inverter including a plurality of switches that link positive and negative DC buses to N output terminals, a separate terminal for each of the inverter phases, the regulator receiving a command current value and generating a command voltage value, the modulator receiving the command voltage value and generating modulating signals used to generate firing pulses to control the switches, the compensation values used to modify the modulating signals to reduce the terminal distortion, the method comprising the steps of:
providing a first high DC current of a first polarity to the regulator and sensing a high regulator output voltage;
providing a first low DC current of the first polarity to the regulator and sensing a low regulator output voltage;
mathematically combining the high and low DC currents and the high and low voltages to generate a compensation value; and
storing the compensation value for subsequent mathematical combination with the modulating signals.

7. The method of claim 6 wherein the steps of providing include providing currents of positive polarity and wherein the step of storing includes the step of storing the compensation values as an upper compensation value and wherein the method further includes the steps of providing a second high DC current of negative polarity to the regulator and sensing a negative high regulator output voltage, providing a second low DC current of negative polarity to the regulator and sending a negative low regulator output voltage, mathematically combining the high and low negative DC currents and the high and low negative voltages to generate a lower compensation value and storing the lower compensation value for subsequent mathematical combination with the modulating signals.

8. The method of claim 6 wherein the step of mathematically combining the currents and voltages includes performing the following function:

$$\Delta V_{Ldist} = V_{Ldist} - V_H^* \frac{I_L}{I_H}$$

where $V_{Ldist}$ is the low voltage value, $V_H^*$ is the high voltage value $I_L$ is the low current value and $I_H$ is the high current value.

9. The method of claim 8 wherein the modulating signals are converted into duty cycle counts prior to being used to generate the firing signals and wherein the method further includes the step of converting the upper and lower compensation values to compensation count values.

10. The method of claim 9 also for compensation the modulating signals and comprising the steps of, during inverter operation, for each phase, identifying the phase current polarity, selecting one of the upper or the lower compensation values as a function of the current polarity to be a compensation signal and mathematically combining the selected compensation signals and the modulating signals to generate a compensated modulating signal.

11. The method of claim 10 wherein the step of mathematically combining the currents and voltages includes performing the following function:

$$\Delta V_{Ldist} = V_{Ldist} - V_H^* \frac{I_L}{I_H}$$

where $V_{Ldist}$ is the low voltage value, $V_H^*$ is the high voltage value, $I_L$ is the low current value, $I_H$ is the high current value and $\Delta V_{Ldist}$ is a distortion voltage value.

12. The method of claim 11 wherein the DC currents are used to generate the high and low voltages with a specific DC bus voltage $V_{dc1}$ and a specific PWM carrier frequency $PWM_{f1}$, the inverter is subsequently operated with a specific DC bus voltage $V_{dc2}$ and a specific carrier frequency $PWM_{f2}$, the step of mathematically combining the currents and voltages to generate the compensation value further includes the step of dividing the distortion voltage value $\Delta V_{Ldist}$ by the product of the DC voltage $V_{dc1}$ and the frequency $PWM_{f1}$ to generate a compensation value and the step of mathematically combining the selected compensation value and the modulating signals includes the step of multiplying the selected value by the product of the DC voltage $V_{dc2}$ and frequency $PWM_{f2}$ to generate a compensation voltage dand adding the compensation voltage and the modulating signal to generate the compensated modulating signal.

13. The method of claim 10 wherein, when the polarity is positive, the step of selecting includes selecting the upper compensation value and when the polarity is negative, selecting the lower compensation value.

14. The method of claim 12 wherein the step of mathematically combining includes, where the upper compensation value is selected, subtracting the selected value from the cycle count and where the lower compensation value is selected, adding the selected value to the cycle count.

15. The method of claim 7 wherein the high current magnitudes and low current magnitudes are within ranges of 70–100% rated current and 5–30% rated current.

16. A method for reducing distortion at the output terminals of an inverter drive system linked to a load wherein the system includes an N phase inverter and an inverter controller, the inverter including a plurality of switches that link positive and negative DC buses to N output terminals, a separate terminal for each of the inverter phases, the controller receiving N modulating signals and a carrier signal and comparing the modulating signals and the carrier signals to generate firing pulses to control the switches, the method comprising the steps of
providing upper and lower compensation values where the upper compensation value is different than the lower compensation value;
determining the polarity of the current passing through the phase output terminal;
when the current polarity is positive, providing the upper compensation value as a compensation signal and, when the polarity is negative, providing the second compensation value as the compensation signal; and
mathematically combining the modulating and compensation signals.

17. The method of claim 16 wherein the modulating signals are duty cycle count and the steps of providing compensation values include providing compensation count values.

18. The method of claim 16 wherein the modulating signals are voltages and the steps of providing compensation values include providing voltage magnitude values.

19. The method of claim 16 wherein the step of providing the upper compensation value includes providing the negative of the upper compensation value and wherein the step of mathematically combining includes the step of adding the compensation signals to corresponding modulating signal.

20. An apparatus for reducing distortion at the output terminals of an inverter drive system, wherein the system includes an N phase inverter and an inverter controller, the inverter including a plurality of switches that link positive and negative DC buses to N output terminals, a separate terminal for each of the inverter phases, the controller receiving N modulating signals and a carrier signal and comparing the modulating signals and the carrier signals to generate firing pulses to control the switches, the apparatus comprising, for each of the N phases:

means for storing upper and lower compensation values where the upper compensation value is different than the lower compensation value, the means for storing linked to and receiving the polarity signal from the means for determining and, when the polarity is positive, providing the upper compensation value as a compensation signal and, when the polarity is negative, providing the lower compensation value as the compensation signal; and means for mathematically combining the modulating and compensation signals.

21. The apparatus of claim 20 wherein each means for combining includes means for adding the modulating signals to corresponding compensation signals.

22. An apparatus for reducing distortion at the output terminals of an inverter drive system, wherein the system includes an N phase inverter and an inverter controller, the inverter including a plurality of switches that link positive and negative DC buses to N output terminals, a separate terminal for each of the inverter phases, the controller receiving N modulating signals and a carrier signal and comparing the modulating signals and the carrier signals to generate firing pulses to control the switches, the apparatus comprising:

a processor running a pulse sequencing program to perform the steps of:

providing upper and lower compensation values where the upper and compensation value is different than the lower compensation value;

determining the polarity of the current passing through the phase output terminal;

when the current polarity is positive, providing the upper compensation value as a compensation signals and, when the polarity is negative, providing the second compensation value as the compensation signal; and mathematically combining the modulating and compensation signals.

23. The apparatus of claim 22 where in the modulating signals are duty cycle counts and the steps of providing compensation values include providing compensation count values.

24. The apparatus of claim 22 wherein the modulating signals are voltages and the steps of providing compensation values include providing voltage magnitude values.

* * * * *